United States Patent
Choi et al.

(10) Patent No.: US 7,324,418 B2
(45) Date of Patent: Jan. 29, 2008

(54) METHOD AND APPARATUS OF DETERMINING A TYPE OF DISC

(75) Inventors: Byoung-ho Choi, Hwaseong-si (KR); Yong-seock Yoon, Hwaseong-si (KR); Soo-yul Jung, Hwaseong-si (KR); Joong-Eon Seo, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 707 days.

(21) Appl. No.: 10/885,896

(22) Filed: Jul. 8, 2004

(65) Prior Publication Data

US 2005/0030867 A1 Feb. 10, 2005

(30) Foreign Application Priority Data

Jul. 11, 2003 (KR) ............... 10-2003-0047411

(51) Int. Cl.
  *G11B 7/00* (2006.01)
(52) U.S. Cl. ............... 369/53.22; 369/44.25; 369/44.27; 369/53.2
(58) Field of Classification Search ............... None
  See application file for complete search history.

(56) References Cited

U.S. PATENT DOCUMENTS 5,966,357 A 10/1999 Ryoo
6,137,758 A 10/2000 Nemoto
6,298,024 B1* 10/2001 Nomura ............... 369/53.22

FOREIGN PATENT DOCUMENTS

| CN | 1175756 | 3/1998 |
|---|---|---|
| CN | 1201223 | 12/1998 |
| EP | 1 486 969 | 12/2004 |
| JP | 10-228717 | 8/1998 |
| JP | 11-250558 | 9/1999 |
| JP | 2000-311357 | 11/2000 |
| JP | 2002-15423 | 1/2002 |
| JP | 2002-32912 | 1/2002 |

OTHER PUBLICATIONS

Office Action issued in Chinese Patent Application No. 200410062493.8 on August 4, 2006.
Search Report issued May 24, 2006 re: Dutch Application No. 1026642 (7 pp).
First Office Action issued by the State of Intellectual Property Office of the People's Republic of China on Jan. 27, 2006 re: Chinese Application No. 2004100624938.

* cited by examiner

*Primary Examiner*—Muhammad Edun
(74) *Attorney, Agent, or Firm*—Stein, McEwen & Bui, LLP (57) ABSTRACT

A method of determining a type of a disc for a disc system to record/reproduce a plurality of recordable discs having different track pitches, including detecting a plurality of signals for determination while moving an objective lens up or down and simultaneously making the objective lens vibrate in a radial direction of the disc, and determining the types of the discs having different track pitches by using the detected signals for determination.

38 Claims, 8 Drawing Sheets

METHOD AND APPARATUS OF DETERMINING A TYPE OF DISC

CROSS-REFERENCE TO RELATED APPLICATION

This application claims the benefit of Korean Patent Application No. 2003-47411, filed on Jul. 11, 2003, in the Korean Intellectual Property Office, the disclosure of which is incorporated herein in its entirety by reference.

BACKGROUND OF THE INVENTION

1. Field of the Invention

The present invention relates to a determination of the type of a disc, and more particularly, to a method of quickly determining the type of a recordable/reproducible optical disc having different track pitches and an apparatus thereof.

2. Description of the Related Art

As different optical discs become available, the types of discs corresponding to an optical disc system for recording/reproducing the discs increases. The time required to recognize the type of disc loaded in the optical disc system is a factor used to evaluate performance of the optical disc system.

Figure 1A:
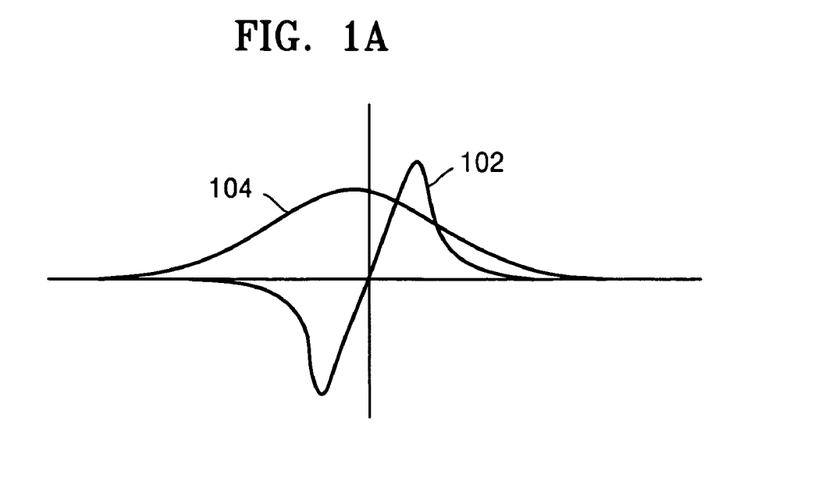
FIGS. 1A, 1B, and 1C illustrate the conventional method of determining the type of an optical disc.
Figure 1B:
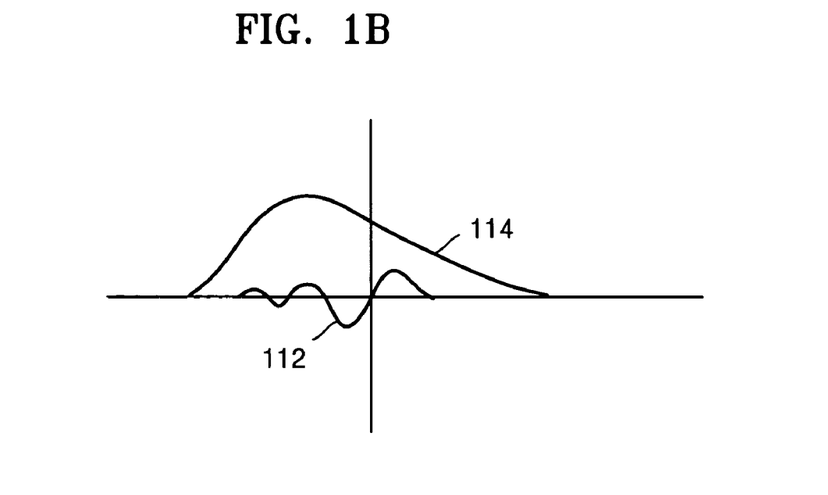
Figure 1C:
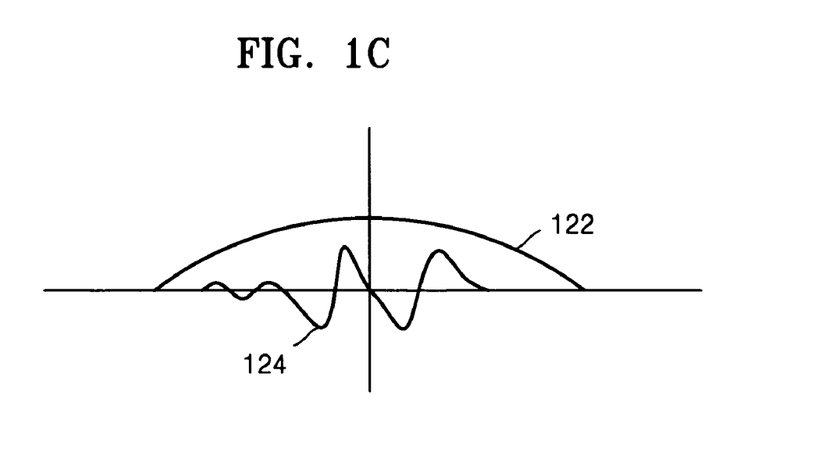

FIGS. 1A-1C show a conventional method of determining the type of an optical disc. In FIGS. 1A-1C, a focus error signal (FES) and a sum signal of a photodiode (PD) are detected while moving an objective lens up and down according to a type of disc, such as a high density disc, a low density disc, and a multilayer disc. That is, when a disc is loaded in an optical disc system capable of recording/reproducing both high and low density discs, the objective lens is moved up and down to detect FES and a sum signal of PD. For the high density disc, as shown in FIG. 1A, a small sum signal 104 of the PD is shown with respect to the FES 102. For the low density disc, as shown in FIG. 1B, a large sum signal 114 of PD is shown with respect to FES 112. For the multilayer disc, as shown in FIG. 1C, as many FESs 124 as the number of layers are generated. Thus, by using these two signals, the type of disc loaded in the optical disc system can be detected, whether the disc is a high density disc, a low density disc, or a multilayer disc.

In order to record/reproduce optical discs of different types, the optical disc system includes an objective lens that is capable of recording/reproducing a low density disc and a high density disc. An additional means, such as a hologram LCD or a ring shielding may be provided to the objective lens to reduce optical aberration.

Determining the type of a disc loaded in the above described optical disc system, such as a disc having a wide track pitch and a disc having a narrow track pitch, is not easy. Using a difference in the amplitude of track error signals generated due to a difference in the track pitch is one way to determine the type of a disc. However, in a conventional optical disc system, to determine whether a disc loaded in the optical disc system is a disc having a wide track pitch or a disc having a narrow track pitch, an objective lens, constituting a pickup unit, is moved up and/or down and track error signals detected after a focus control starts are referred to in determining the disc type. Therefore, it takes a long time to detect the disc type.

SUMMARY OF THE INVENTION

To solve the above and/or other problems, the invention provides a method and apparatus for quickly determining a type of disc having different track pitches.

Also, the invention provides a method and apparatus for quickly determining a type of disc having different track pitches with improved reliability, including moving the objective lens up/down.

Also, the invention provides a method and apparatus for quickly determining a disc type by changing a direction of movement of an objective lens after a predetermined time according to a time when a signal required for the determination of a disc is detected, including moving the objective lens up/down and vibrating the objective lens in a radial direction.

According to an aspect of the invention, a method of determining a type of a disc for an optical disc system to record/reproduce a plurality of recordable discs having different track pitches, includes detecting a plurality of signals for determination while moving an objective lens up or down and simultaneously making the objective lens vibrate in a radial direction of the disc, and determining the types of the discs having different track pitches by using the detected signals for determination.

According to another aspect of the invention, a method of determining a type of a disc for an optical disc system capable of recording and/or reproducing and having an optical pickup including a light emitting device, an objective lens, and a light receiving device, includes determining whether a track error signal, a focus error signal, and/or a sum signal of the light receiving device are detected while moving the objective lens up or down and simultaneously making the objective lens vibrate in a radial direction of the disc, and determining the types of the discs having different track pitches by using the amplitudes of the detected track error signal, the detected focus error signal, and/or the detected sum signal of the light receiving device.

According to another aspect of the invention, an apparatus for determining a type of a disc for an optical disc system capable of recording and/or reproducing, includes an optical pickup including a laser diode, an objective lens, and a light receiving device, a driving portion moving the objective lens up/down and simultaneously making the objective lens vibrate in a radial direction of the disc, a detection unit detecting a sum signal of the light receiving device, a track error signal, and/or focus error signal while the objective lens is moved up/down and vibrated in the radial direction by the driving portion, and a controller determining the types of discs having different track pitches by using the detected sum signal of the light receiving device, the detected track error signal, and/or the detected focus error signal.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 2:
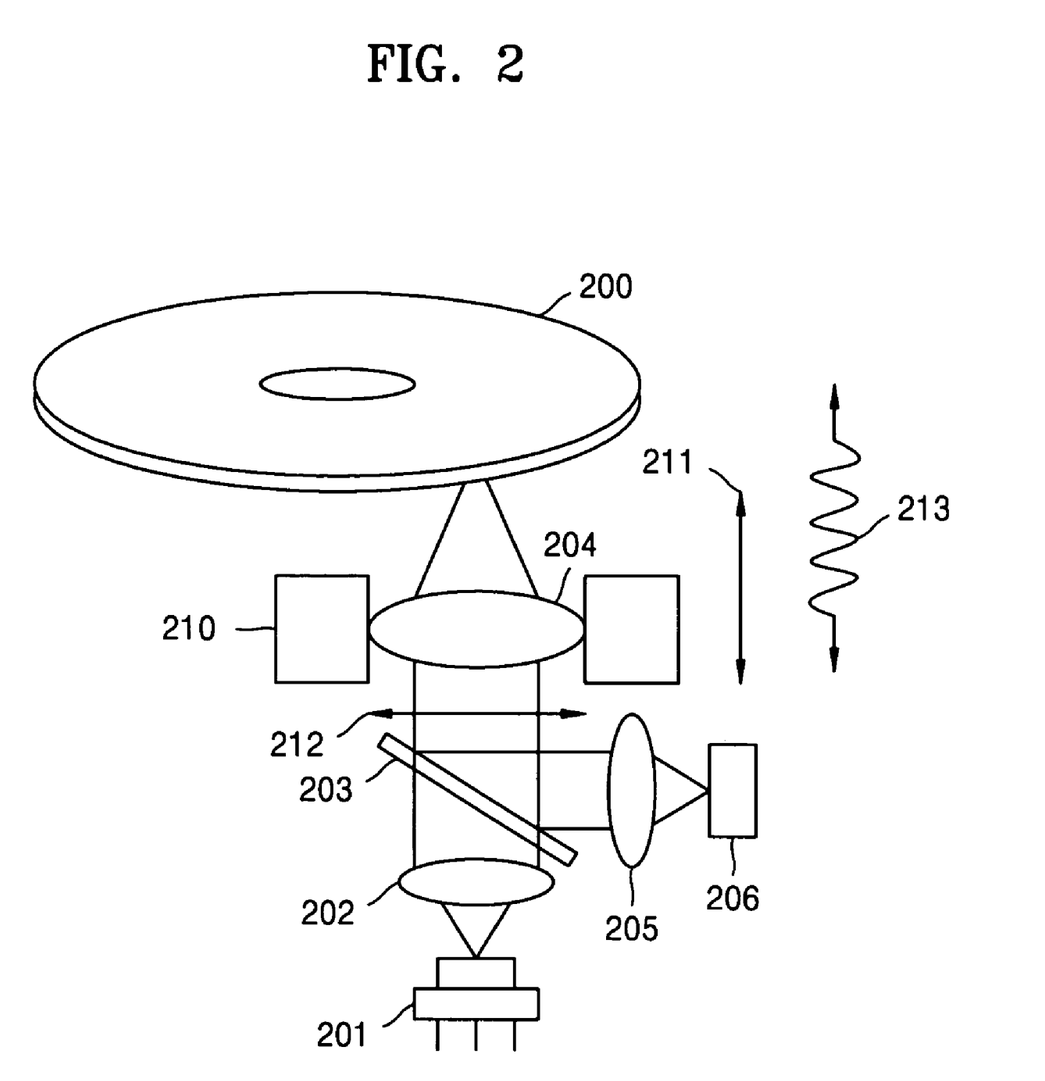
FIG. 2 illustrates a configuration and a movement trace of an optical pickup according to an embodiment of the invention.

Referring to FIG. 2, an optical pickup (or a pickup unit) according to an aspect of the invention, includes a laser diode 201, a beam shaping lens 202, a mirror 203, an objective lens 204, a cylindrical lens 205, and a photodiode 206. Reference numeral 200 denotes an optical disc and reference numeral 210 denotes an actuator that enables the objective lens 204 to vibrate in both axial and radial directions.

In the signal flow in a conventional optical pickup, a light beam emitted from a laser diode 201 having a short wavelength capable of reproducing a high density optical disc is changed to a light beam having an almost circular section while passing through the beam shaping lens 202. The light beam passes through the mirror 203 and is incident on the objective lens 204 having a high numerical aperture. The incident light beam passes through the objective lens 204 and is focused on a recording surface of the optical disc 200 to read information recorded on the optical disc 200. The light beam reflected from the optical disc 200 is reflected by the mirror 203 and passes through the cylindrical lens 205 to form a focus on the photodiode 206. The light beam passes through the cylindrical lens 205 and focuses on the photodiode 206, where the light beam is changed to an electrical signal. The photodiode may be a module in which a laser diode and a photodiode are incorporated. The laser diode and the photodiode may be referred to as a light emitting device and a light receiving device, respectively.

Arrow 211, shown in FIG. 2, traces an up and down movement of the objective lens 204, which is moved up and down by the actuator 210, along an optical axis. Arrow 212 traces a movement of the objective lens 204, which is vibrated by the actuator 210, in a radial direction across the disc 200. Arrow 213 traces a movement of the objective lens 204, which is vibrated by the actuator 210, in the radial direction and is simultaneously moved up and down by the actuator 210, along an optical axis.

Figure 3:
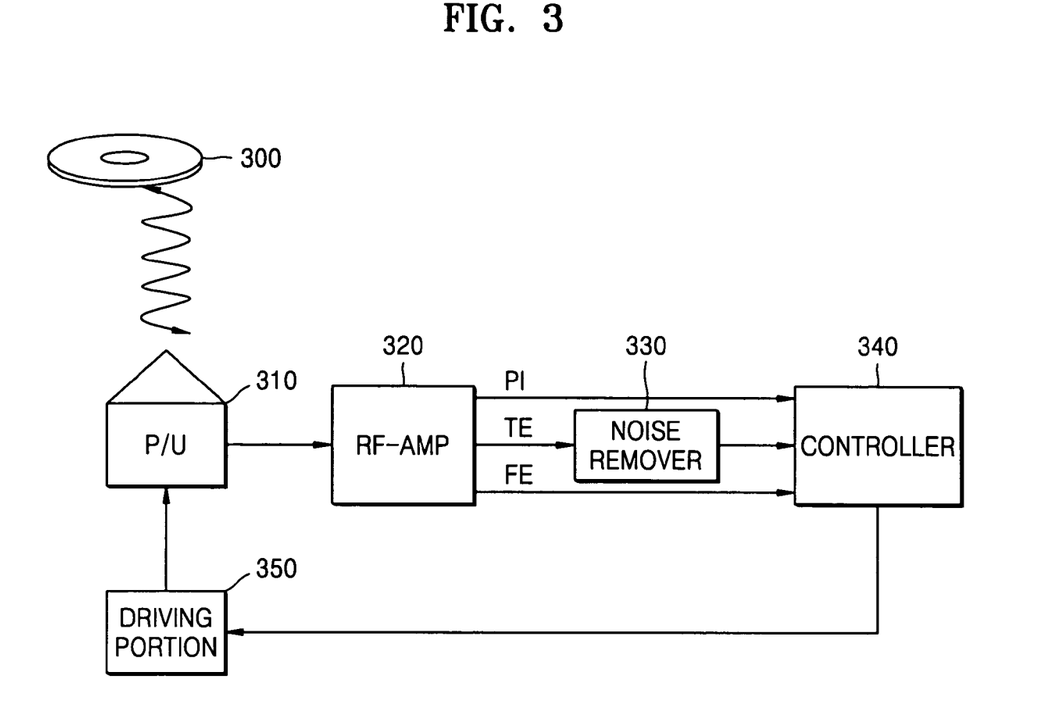
FIG. 3 is a block diagram illustrating an apparatus for determining a type of an optical disc according to an embodiment of the invention.

FIG. 3 is a block diagram illustrating an apparatus for determining the type of an optical disc according to an aspect of the invention. The apparatus includes an optical disc 300, a pickup unit (P/U) 310, a reproduction signal amplifier (RF-AMP) 320, a noise remover 330, a controller 340, and a driving portion 350. The apparatus can be applied to an optical disc system capable of recording/reproducing a recordable disc having a narrow track pitch and/or a recordable disc having a wide track pitch.

The pickup unit 310 shown in FIG. 3 is the same as the pickup unit shown in FIG. 2. However, the apparatus is not limited to such a design. The light beam emitted from a laser diode passes through an objective lens and is focused on a recording surface of an optical disc so that information recorded on the optical disc can be read by using the focus of the light. The light reflected from the optical disc is converted to an electrical signal by the photodiode. The RF-AMP 302 outputs a servo control signal and a high frequency (RF) signal (or a reproduction signal) capable of detecting information stored on the optical disc, from the electrical signal. The apparatus determines a type of optical disc at a time (a focus search operation) when the objective lens is moved up/down by using a sum signal of the photodiode and the servo control signals (a track error signal and a focus error signal) output from the RF-AMP 320.

When the optical disc 300 is loaded in the optical disc system, the laser diode in the pickup unit 310 operates and the objective lens moves up/down. The objective lens is moved up/down by a focus actuator (not shown) in the driving portion 350. The driving portion 350 includes motors and actuators to move the objective lens or the pickup unit 310 along predetermined paths above the optical disc. In particular, the driving portion 350 includes a focus actuator to move the objective lens up/down, a tracking actuator to move the objective lens in a radial direction, and a pickup transfer motor (sled motor) to move the pickup unit 310 in a radial direction.

The invention is described using a DVD-RAM and a DVD-RW among recordable discs having lands and grooves. The recordable discs such as DVD-RAM's and DVD-RW's are physically different in some points. However, it is understood that the invention is not limited to such optical discs.

The recordable disc has grooves, in a form of a land/groove, formed on the surface thereof in a direction in which the disc rotates and data is typically recorded in the grooves. During recording, the DVD-RAM adopts a land/groove recording method while the DVD-RW adopts a groove recording method. The track pitch, that is, a distance between grooves, of a 4.7 GB DVD-RAM has a distance of 1.23 µm (0.615×2) and the DVD-RW has a distance of 0.74 µm. Accordingly, the difference in the amplitude of the track error signal according to the difference in the track pitch is high. The amplitude of the track error signal of the DVD-RAM having a wide track pitch is much greater than that of the DVD-RW having a narrow track pitch. To increase the speed of determination of the type of a disc while utilizing this feature, the invention can quickly determine the type of the two recordable discs by changing the direction of the objective lens after a predetermined time from a point when a signal needed for disc determination is detected when the objective lens is initially moved up/down.

In addition, assuming that a light detection portion of the photodiode is divided into four sections A, B, C, and D, which are located in a left upper portion, a right upper portion, a right lower portion, and a left lower portion, respectively, differential output signals of two channels are detected by using a push-pull amplifier. The differential output signals of the two channels are expressed as (A+D)−(B+C), a differential signal between a sum signal of electrical signals of the left upper and lower sections and a sum signal of electrical signals of the right upper and lower sections, and (B+C)−(A+D), a differential signal between a sum signal of electrical signals of the right upper and lower sections and a sum signal of electrical signals of the left upper and lower sections. The differential output signal is referred to as a push-pull signal and is used as a track error signal TE. The push-pull amplifier may be provided in the RF-AMP 220. Also, the push-pull amplifier detects a sum signal (A+B+C+D) of four channels of the photodiode and the detected signal is used as a reproduction signal for detecting information. In the present invention, the RF signal together with the servo control signal is used for disc determination and referred to as a sum signal of the photodiode PD and indicated as PI.

Thus, the controller 340 determines whether a loaded disc is a recordable disc having a narrow track pitch or a recordable disc having a wide track pitch by monitoring signals needed for disc determination, that is, the track error signal TE, the focus error signal FE, and/or the sum signal PI of the photodiode, at a point near a focal point where the amplitude of the sum signal PI of the photodiode exceeds a predetermined amount while the objective lens is moved up/down. Here, the optical disc 300 is rotating.

The noise remover 330 may be configured to have a high pass filter to avoid an effect by a low frequency noise contained in the track error signal TE, a band pass filter to avoid an effect by a high frequency noise, or both filters.

To generate the track error signal TE, the light beam needs to move across the tracks. When the disc rotates, the track error signal TE may be generated due to eccentricity or deviations of the disc. The track error signal TE is not generated instantly two times for each turn of the disc. This is because, when a light spot changes the scan direction of the track by the eccentricity during the rotation of the disc, the frequency of the track error signal TE is lowered so that it is not easy to detect the track error signal TE.

To quickly determine the type of a loaded optical disc at the initial stage, the track error signal can be detected when a focus point is formed on a recording surface of the optical disc as the objective lens is moved up/down. When the disc rotates, the track error signal is mostly generated due to the eccentricity or deviation. When the disc stops rotating, the track error signal is not detected unless a vibration is generated in the radial direction.

Thus, the track error signal can be easily detected by moving the objective lens up/down, as indicated by the arrow 211 of FIG. 2, and simultaneously vibrating the objective lens in the radial direction of the disc, as indicated by the arrow 212 of FIG. 2. The frequency to vibrate the objective lens in the radial direction is higher than the frequency to move the objective lens up/down so as to avoid the effect by the eccentricity.

The driving portion 350 may not drive the tracking actuator, which vibrates the objective lens in the radial direction of the disc 300, but may drive the pickup transfer motor (the sled motor), which moves the pickup unit 310 in the radial direction. In the present embodiment, the controller 340 not only determines the disc type but also functions as a servo controller to provide a servo driving signal to drive the driving portion 350. However, the servo controller may be separately provided.

When the controller 340 determines the type of a disc, the track error signal TE whose amplitude differs according to the track pitch can be used. Alternatively, the ratio in the amplitude between the sum signal PI of the photodiode and the track error signal TE can also be used. This is because, although there may be a disc in which a series of signals, including the track error signal TE, is large or small as the amount of reflection of a laser beam varies according to the disc, a deviation due to the disc type can be reduced since the ratio of the amplitude between the sum signal PI of the photodiode and the track error signal TE is constant, regardless of the amount of reflection variation of a laser beam.

For example, reflection rates are different between a disc on which data is recorded and a disc on which data is not recorded. Recorded disc typically have a lower reflection rate, therefore, determining the type of a disc with only the track error signal may cause a detection error. Thus, by normalizing the track error signal TE, the error in detecting the disc type can be reduced even when the reflection rate of the disc is changed. The normalization can be performed by using the sum signal PI of the photodiode or the focus error signal FES. Equations 1 and 2 below show a method of normalizing the TE signal by using the PI signal and the FES.

TEnp (a normalized TE using the PI signal)=TE/PI  [Equation 1]

TEnf (a normalized TE using the FES)=TE/FES  [Equation 2]

In the present embodiment, to determine discs having different track pitches, the normalized track error signal TEnp using the PI signal expressed in Equation 1 or the normalized track error signal TEnf using the FES expressed in Equation 2 may be used. Alternatively, both TEnp and TEnf can be used together to improve reliability. This is because sometimes the FES is normally output even when a distortion is generated in the PI signal due to a defect in the disc.

Thus, when a disc is loaded in an optical disc system, the controller 340 controls the driving portion 350 to make the objective lens move up/down and to simultaneously vibrate the objective lens or the pickup unit 310 in the radial direction, and determines the disc type by using the track error signal TE passed through the noise remover 330. Alternatively, the controller 340 can determine the disc type by using a ratio in the amplitude between the sum signal PI of the photodiode and the track error signal TE, that is, the normalized track error signal TEnp using the PI signal. Also, the controller 340 can determine the disc type by using a ratio in the amplitude between the track error signal TE and the focus error signal FES, that is, the normalized focus error signal TEnf using the FES. In addition, the disc type can be determined by combing two or more of the above three signals.

Figure 4:
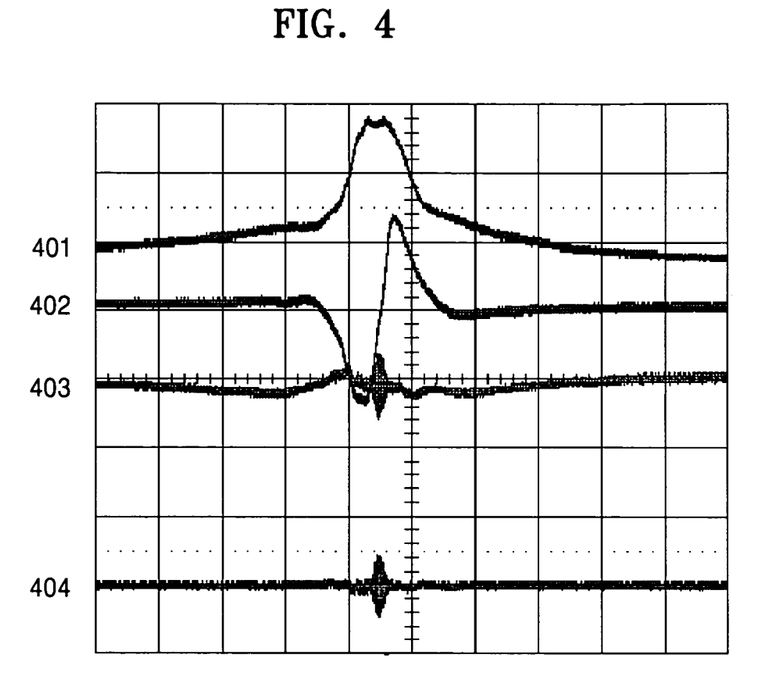
FIG. 4 is a waveform diagram of signals generated from the apparatus shown in FIG. 3 when a recordable disc having a narrow track pitch is used.

FIG. 4 is a waveform diagram of signals generated from the apparatus of FIG. 3 when a recordable disc (DVD-RW) having a narrow track pitch is adopted. In FIG. 4, 401 indicates the sum signal PI of the photodiode output from the RF-AMP 320; 402 indicates the focus error signal FES output from the RF-AMP 320; 403 is the track error signal TE output from the RF-AMP 320; and 404 indicates the track error signal TE passed through the noise remover 330.

Figure 5:
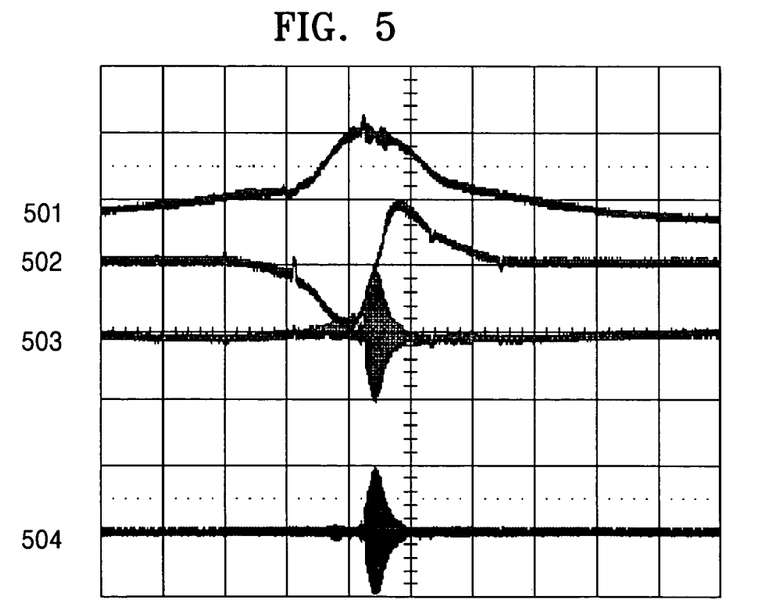
FIG. 5 is a waveform diagram of signals generated from the apparatus shown in FIG. 3 when a recordable disc having a wide track pitch is used.

FIG. 5 is a waveform diagram of signals generated from the apparatus of FIG. 3 when a recordable disc (DVD-RAM) having a wide track pitch is adopted. In FIG. 5, 501 indicates the sum signal PI of the photodiode output from the RF-AMP 320; 502 indicates the focus error signal FES output from the RF-AMP 320; 503 is the track error signal TE output from the RF-AMP 320; and 504 indicates a track error signal TE passed through the noise remover 330.

Thus, as shown in FIGS. 4 and 5, since the distribution of a reflectance of the DVD-RW is typically higher than that of the DVD-RAM, the amplitudes of the sum signal PI 401 of the photodiode and the focus error signal FES 402 are greater than those of 501 and 502. Although a difference in the reflectance due to the difference in the track pitch is high, the track error signal TE 403 in the DVD-RW is smaller than the track error signal TE 503 in the DVD-RAM. Thus, due to the above difference, it is possible to determine the types of two discs from the track error signal only.

Figure 6:
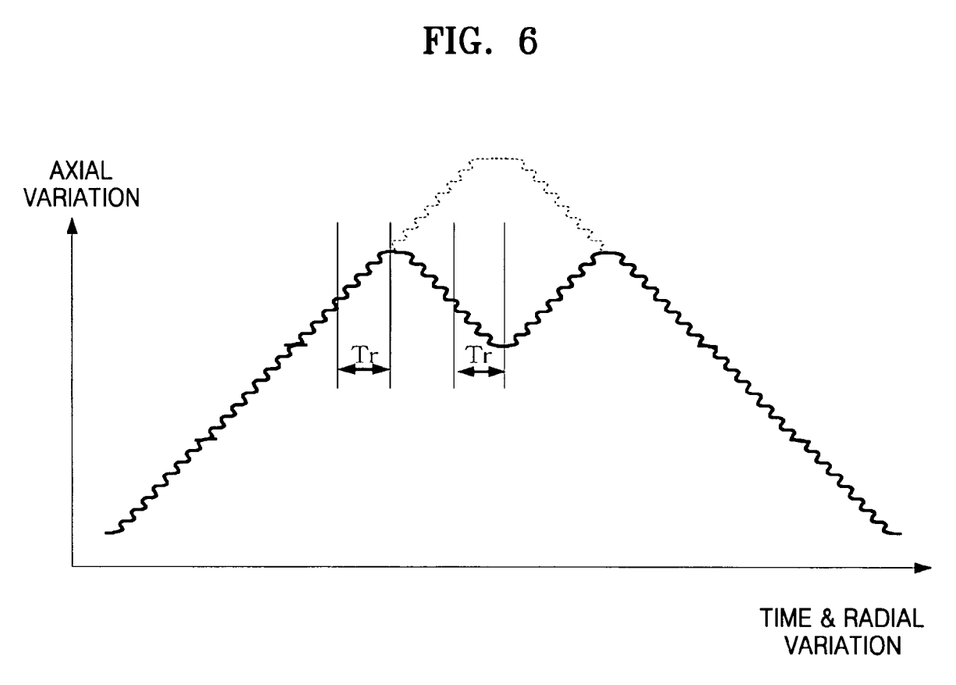
FIG. 6 is a view showing the trace of an objective lens used in the invention with respect to up/down movements and a radial vibration according to a time passage.

FIG. 6 illustrates a tracing of a movement of an objective lens used in the invention with respect to up/down movements and a radial vibration according to a time passage. Referring to FIG. 6, at the initial stage, the objective lens is moved upward from the lowest point previously set for focus and simultaneously vibrates in a radial direction. The moving direction of the objective lens is changed (to move downward) after a predetermined time Tr passes from a point when any of FES, PI, and TE is detected. Then, the objective lens is moved downward and simultaneously vibrates in the radial direction. The moving direction of the objective lens is again changed to move upward after the predetermined time Tr passes from a point when any of FES, PI, and TE is detected. To improve reliability in the above method, the signals, that is, TE, FES, and PI, which are necessary for the determination of a disc, are detected two or four times.

By moving the objective lens with respect to a focus position, the time required for the objective lens to move above the focus position is reduced, thereby increasing the frequency of repeating the detection of FES, PI, and TE, which allows for more reliable data to be obtained. In FIG. 6, a dotted line indicates the up/down movement of the objective lens according to the conventional determination method in which the objective lens is moved upward to the preset highest point and downward to the lowest point. A solid line indicates the up/down movement of the objective lens according to the present invention in which the direction of the objective lens is changed after a predetermined time from a point when a signal needed for the determination of a disc is detected and the signal needed for the determination of a disc is detected in a multiple number so that reliability and rapidity in the determination are secured.

Figure 7:
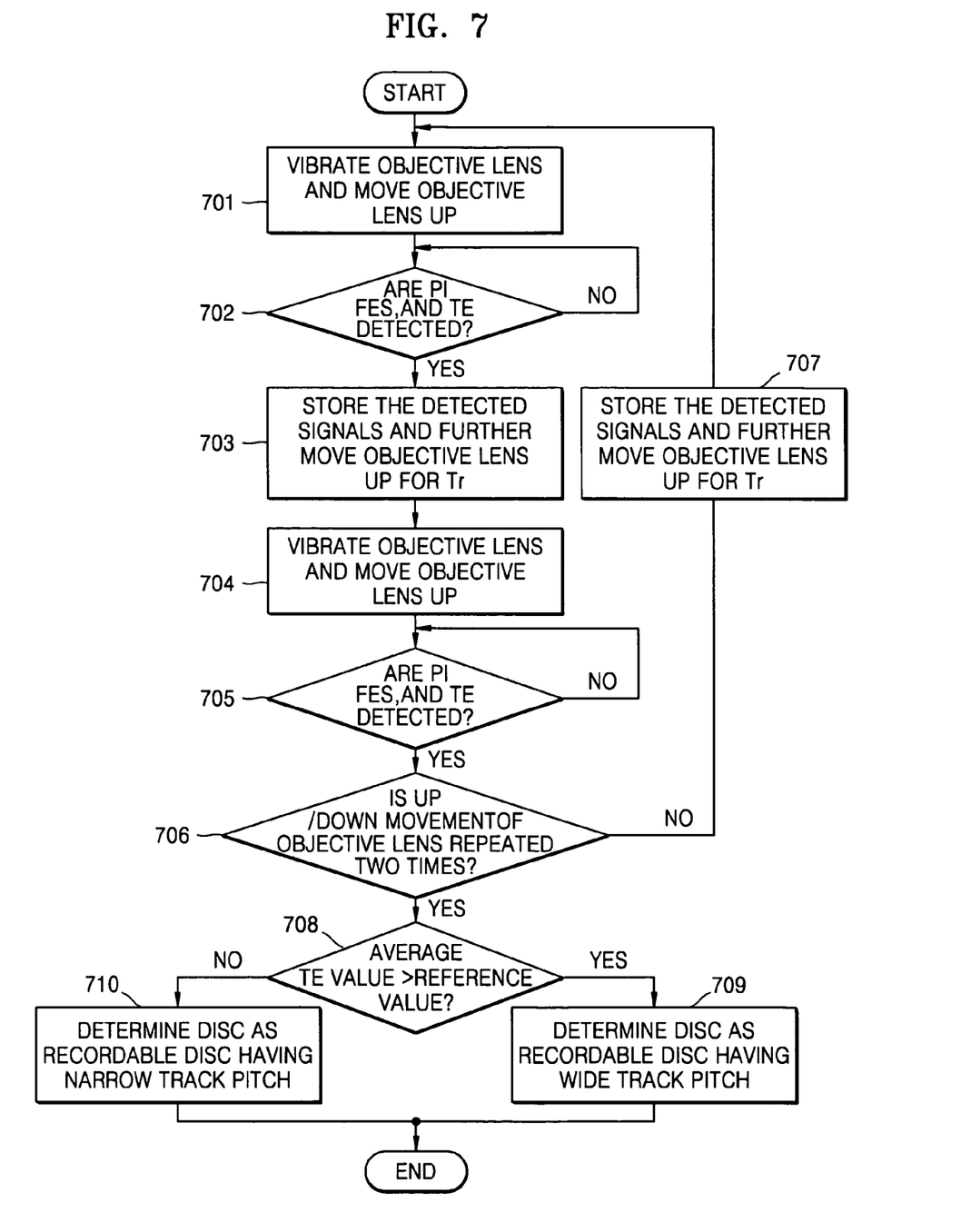
FIG. 7 is a flow chart describing a method of determining the type of an optical disc according to an embodiment of the invention.

FIG. 7 is a flow chart for explaining an aspect of the invention. The method is described with reference to FIGS. 3 and 7. Referring to FIG. 7, in operation 701 a tracking actuator of the driving portion 350 is driven to vibrate the objective lens in a radial direction of a disc and simultaneously drive a focus actuator to move the objective lens upward. Alternatively, in operation 701, the pickup transfer motor can be driven to vibrate a pickup unit 310 in the radial direction instead of driving the tracking actuator. The optical disc 300 is rotating during this operation.

In operation 702, it is determined whether the sum signal PI of the photodiode, the focus error signal FES, and the track error signal TE are detected from the signals output from the RF-AMP 320 when the objective lens is moved up and simultaneously vibrates in the radial direction. The signal passed through the noise remover 330 can be used as the track error signal TE.

If any one of the sum signal PI of the photodiode, the focus error signal FES, and the track error signal TE is detected in operation 702, the detected signal is stored in an inner storing unit of the controller 340 in operation 703. After the objective lens moves up for a predetermined time Tr, as shown in FIG. 6 (Operation 703), the tracking actuator moves the objective lens in the radial direction while changing the movement direction of the objective lens from upward to downward (operation 704).

When the objective lens is moved down and vibrates in the radial direction in operation 704, it is determined whether any one of the sum signal PI of the photodiode, the focus error signal FES, and the track error signal TE is detected (operation 705).

When any of the sum signal PI of the photodiode PD, the focus error signal FES, and the track error signal TE is detected in operation 705, it is determined whether the up and down movements of the objective lens are repeated a predetermined number of times, such as two times (operation 706). If the up and down movements of the objective lens are not repeated the predetermined number of times, the detected signal is stored in the inner storing unit of the controller 340 and the objective lens is further moved down for the predetermined time Tr as shown in FIG. 6 (operation 707). In operation 706, in order to secure reliability, the up and down movements of the objective lens can be repeated more than two times. For a faster determination speed, each signal detected during the up or down movement of the objective lens can be used.

When the up and down movements of the objective lens is repeated the predetermined number of times in operation 706, an average value of each of the detected track error signals is determined in operations 702 and 705 and compared with a reference value (operation 708). When the average value of each of the detected track error signals is greater than the reference value, the disc is determined as a recordable disc (DVD-RAM) having a wide track pitch (operation 709). Otherwise, the disc is determined as a recordable disc (DVD-RW) having a narrow track pitch (Step 710).

Figure 8:
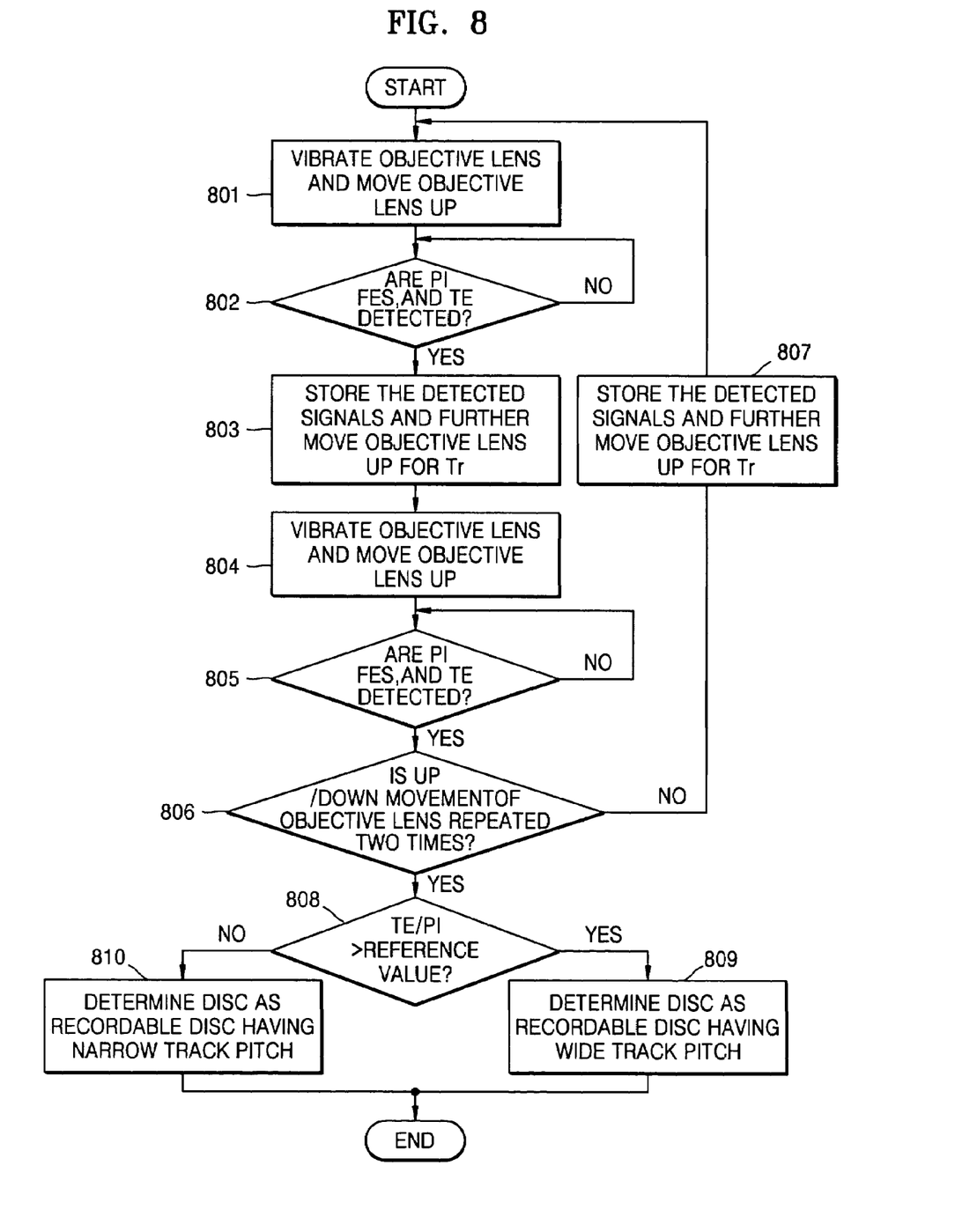
FIG. 8 is a flow chart for explaining a method of determining the type of an optical disc according to another embodiment of the present invention.

FIG. 8 is a flow chart illustrating a method of determining the type of an optical disc according to another aspect of the invention. The method shown in FIG. 8, is different from the method shown in FIG. 7, in that operation 808 uses a ratio in the amplitude between the sum signal PI of the photodiode and the track error signal TE, that is, the normalized track error signal TEnp using the PI signal, unlike operation 708 of FIG. 7, which only uses the track error signal.

Figure 9:
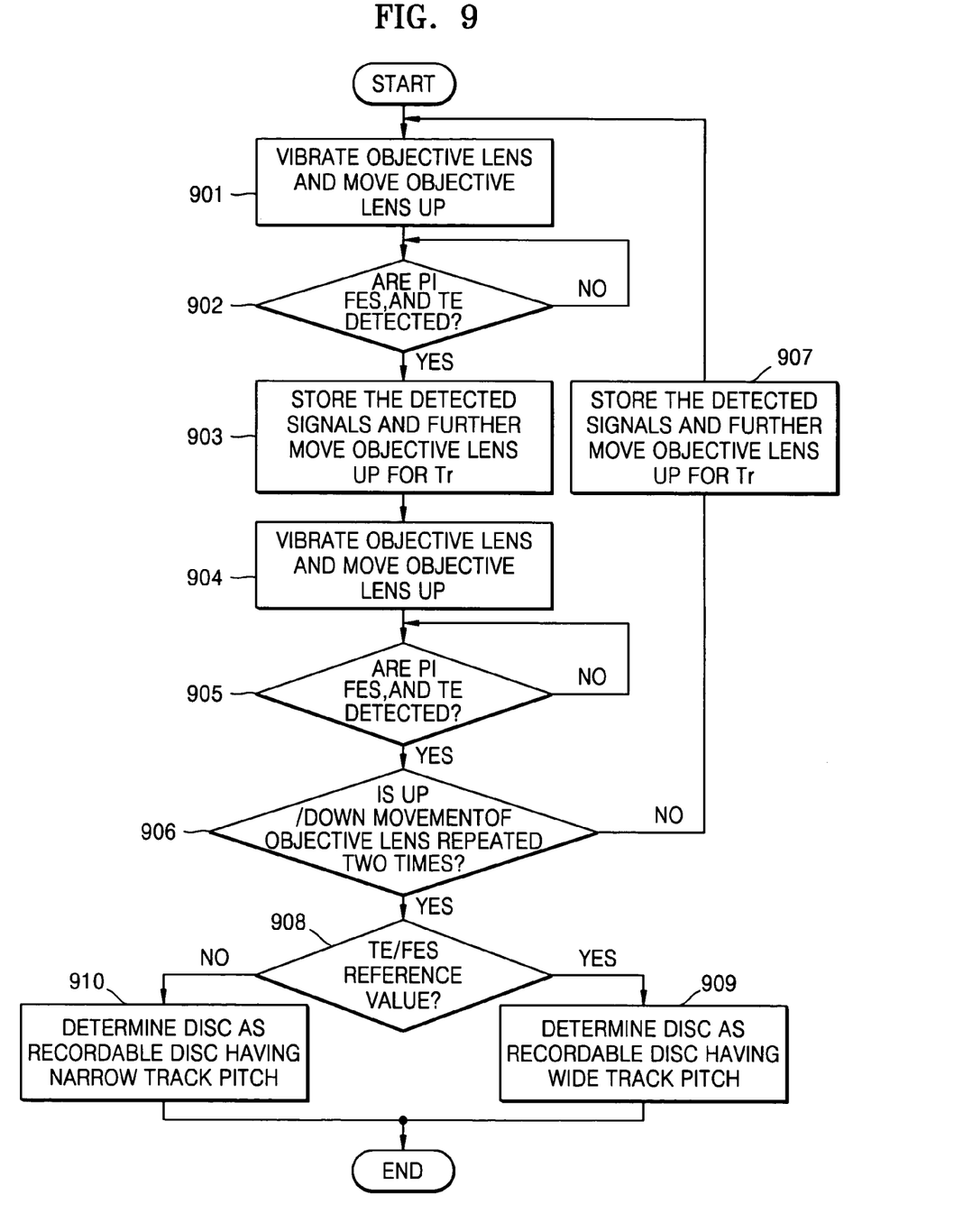
FIG. 9 is a flow chart for explaining a method of determining the type of an optical disc according to yet another embodiment of the present invention.

FIG. 9 is a flow chart illustrating a method of determining the type of an optical disc according to another aspect of the invention. The method shown in FIG. 9, is different from the method shown in FIG. 7, in that operation 908 uses a ratio in the amplitude between the track error signal TE and the focus error signal FES, that is, the normalized track error signal TEnf using the focus error signal FES, unlike operation 708 of FIG. 7, which only uses the track error signal.

The reference values used in operation 708 of FIG. 7, operation 808 of FIG. 8, and operation 908 of FIG. 9 can be referred to as a first, a second, and a third reference value, respectively. Also, two or more of the track error signal TE described in operation 708 of FIG. 7, the normalized track error signal TEnp using the PI signal described in operation 808 of FIG. 8, and the normalized track error signal TEnf using the FES described in operation 908 of FIG. 9 can be used for the above method.

The invention can be applied to an optical disc system for recording/reproducing a plurality of recordable discs having different track pitches.

As described above, according to the invention, as compared to the conventional method in which the type of a disc can be determined only after a focus control or tracking control starts, since the type of disc can be determined at a determination initial stage in which the objective lens is moved in a direction perpendicular to a surface of the optical disc, the disc determination time is reduced so that performance of the optical disc system is improved and a high reliability can be obtained. Also, since the types of discs having different track pitches can be determined with only the movements in the perpendicular direction to the surface of the optical disc and vibration of the objective lens, the system can be quickly initialized. Furthermore, since the direction of the objective lens is changed after a predetermined time after a point when the signals needed for the disc determination are determined, the type of a disc can be more quickly determined. Therefore, the disc determination time is reduced and the performance of the optical disc system is improved.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of determining a type of a disc from a plurality of types of discs corresponding to different track pitches for a disc recordable/reproducible system, the method comprising:
   detecting a plurality of signals for determination of the type of the disc, while moving an objective lens in an up or down direction and simultaneously vibrating the objective lens in a radial direction of the disc; and
   determining the type of the disc according to a track pitch by using detected signals for determination of the type of the disc.

2. The method as claimed in claim 1, wherein the detecting the signals for determination of the type of the disc comprises:
   reversing the up or down direction of the objective lens after a predetermined time from when the signals for determination are detected.

3. The method as claimed in claim 2, wherein the detecting the signals for determination of the type of the disc further comprises:
   repeating the detecting the signals for determination of the type of the disc after reversing the up or down direction of the objective lens to improve reliability in the determination,
   wherein the type of disc is determined by using the signals for determination of the type of the disc, which are detected at least two times.

4. The method as claimed in claim 3, wherein the signals for determination of the type of the disc comprise a track error signal, a focus error signal, and/or a sum signal of a light receiving device.

5. The method as claimed in claim 4, wherein the track error signal is a signal in which a low frequency noise and/or a high frequency noise is removed.

6. The method as claimed in claim 4, wherein, in the determining the type of the disc according to the different track pitch, the track pitch of the disc is determined by using an amplitude of the track error signal.

7. The method as claimed in claim 4, wherein, in determining the type of the disc according to the different track pitch, the track pitch of the disc is determined by using a ratio of an amplitude of the track error signal and an amplitude of the focus error signal.

8. The method as claimed in claim 4, wherein, in determining the type of the disc according to the different track pitch, the track pitch of the disc is determined by using a ratio of an amplitude of the track error signal and an amplitude of the sum signal of the light receiving device.

9. The method as claimed in claim 4, wherein, in determining the type of the disc according to the different track pitch, the track pitch of the disc is determined by combining at least two of an amplitude of the track error signal, a ratio of an amplitude between the track error signal and an amplitude of the focus error signal, and a ratio of an amplitude between the track error signal and an amplitude of the sum signal of the light receiving device.

10. The method as claimed in claim 1, wherein, in determining the type of the disc according to the different track pitch, the type of the disc is determined while rotating the disc.

11. The method as claimed in claim 1, wherein, in detecting the signal for determination of the type of the disc, a frequency that vibrates the objective lens in the radial direction is higher than a frequency that moves the objective lens in the up or down direction.

12. A method of determining a type of a disc for a disc system capable of recording and/or reproducing and having an optical pickup including a light emitting device, an objective lens, and a light receiving device, the method comprising:
   detecting a track error signal, a focus error signal, and/or a sum signal of the light receiving device, while moving the objective lens in an up or down direction and simultaneously vibrating the objective lens in a radial direction of the disc; and
   determining the type of the disc according to a track pitch by using amplitude of the detected track error signal, the detected focus error signal, and/or the detected sum signal of the light receiving device.

13. The method as claimed in claim 12, further comprising:
   moving the objective lens further in the up or down direction for a predetermined time and reversing the moving direction of the objective lens when detecting the track error signal, the focus error signal, and/or the sum signal of the light;
   simultaneously vibrating the objective lens in the radial direction, while reversing the moving direction of the objective lens; and
   repeating the detecting the track error signal, the focus error signal, and/or the sum signal of the light receiving device and simultaneously vibrating the objective lens in the radial direction of the disc, moving the objective lens further in the up or down direction for the predetermined time and reversing the moving direction of the objective lens when detecting the track error signal, the focus error signal, and/or the sum signal of the light, and the simultaneously vibrating the objective lens in the radial direction while the moving direction of the objective lens is reversed, a predetermined number of times and using the predetermined number of the detected track error signal, the detected focus error signal, and/or the detected sum signal of the light receiving device for the moving of the objective lens further in the up or down direction for the predetermined time and reversing the moving direction of the objective lens.

14. The method as claimed in claim 12, wherein the track error signal is a signal in which a low frequency noise and/or a high frequency noise is removed.

15. The method as claimed in claim 12, further comprising determining whether the type of the disc is a disc having a narrow track pitch or a disc having a wide track pitch by using the amplitude of the track error signal.

16. The method as claimed in claim 12, further comprising determining whether the type of the disc is a recordable disc having a narrow track pitch or a recordable disc having a wide track pitch by using a ratio of an amplitude of the sum signal of the light receiving device and an amplitude of the track error signal.

17. The method as claimed in claim 12, further comprising determining whether the type of the disc is a recordable disc having a narrow track pitch or a recordable disc having a wide track pitch by utilizing a ratio of an amplitude between the track error signal and an amplitude of the focus error signal.

18. The method as claimed in claim 12, further comprising determining whether the type of the disc is a recordable disc having a narrow track pitch or a recordable disc having a wide track pitch by combining at least two of the amplitude of the detected track error signal, a ratio of an amplitude of the sum signal of the light receiving device and an amplitude of the track error signal, and a ratio of an amplitude of the track error signal and an amplitude of the focus error signal.

19. The method as claimed in claim 13, wherein the determining the type of the disc according to the track pitch by using the amplitude of the detected track error signal, the detected focus error signal, and/or the detected sum signal of the light receiving device, comprises:
  comparing an average value of the predetermined number of the detected track error signals with a first reference value; and
  determining the type of the disc as a disc having a wide track pitch when the average value of the track error signal is greater than the first reference value, and, determining the type of the disc as a disc having a narrow track pitch when the average value of the track error signal is not greater than the first reference value.

20. The method as claimed in claim 13, wherein the determining the type of the disc according to the track pitch by using the amplitude of the detected track error signal, the detected focus error signal, and/or the detected sum signal of the light receiving device, comprises:
  comparing a ratio of an amplitude of the predetermined number of the detected sum signal of the light receiving device and an amplitude of the detected track error signal with a second reference value; and
  determining the type of the disc as a recordable disc having a wide track pitch when the track error signal using the sum signal is greater than the second reference value, and determining the type of the disc as a recordable disc having a narrow track pitch when the track error signal using the sum signal is not greater than the second reference value.

21. The method as claimed in claim 13, wherein the determining the type of the disc according to the track pitch by using the amplitude of the detected track error signal, the detected focus error signal, and/or the detected sum signal of the light receiving device, comprises:
  comparing a ratio of the amplitude between the predetermined number of the detected track error signal and the detected focus error signal with a third reference value; and
  determining the type of the disc as a recordable disc having a wide track pitch when the track error signal using the focus error signal is greater than the third reference value, and determining the type of the disc as a recordable disc having a narrow track pitch when the track error signal using the focus error signal is not greater than the third reference value.

22. The method as claimed in claim 12, wherein, in the determining the type of the disc according to the track pitch by using the amplitude of the detected track error signal, the detected focus error signal, and/or the detected sum signal of the light receiving device, the type of the disc is determined while rotating the disc in the disc system.

23. The method as claimed in claim 12, wherein, in the detecting a track error signal, a focus error signal, and/or a sum signal of the light receiving device while moving the objective lens in an up or down direction and simultaneously vibrating the objective lens in the radial direction of the disc, a frequency that vibrates the objective lens in the radial direction is higher than a frequency that moves the objective lens in the up/down direction.

24. An apparatus for determining a type of a disc for a disc system capable of recording and/or reproducing, the apparatus comprising:
  an optical pickup including a laser diode, an objective lens, and a light receiving device;
  a driving portion moving the objective lens id an up or down direction and simultaneously vibrating the objective lens in a radial direction of the disc;
  a detection unit detecting a sum signal of the light receiving device, a track error signal, and/or focus error signal, while the objective lens is moving in the up or down direction and simultaneously vibrating in the radial direction by the driving portion; and
  a controller determining the type of disc according to a track pitch by using the sum signal of the light receiving device, the track error signal, and/or the focus error signal.

25. The apparatus as claimed in claim 24, wherein, when the track error signal, the focus error signal, and the sum signal of the light receiving device are detected while the objective lens is moved in the up or down direction and vibrated in the radial direction, the driving portion further moves the objective lens in the up or down direction for a predetermined time and then moves the objective lens down or up in a reverse direction and vibrates the objective lens in the radial direction of the disc.

26. The apparatus as claimed in claim 24, further comprising a noise remover that removes a noise component of the track error signal and provides the track error signal to the controller.

27. The apparatus as claimed in claim 26, wherein the noise remover comprise a high pass filter to remove a low frequency noise from the track error signal.

28. The apparatus as claimed in claim 26, wherein the noise remover comprises a band pass filter to remove a high frequency noise from the track error signal.

29. The apparatus as claimed in claim 24, wherein the controller determines whether the type of the disc is a recordable disc having a narrow track pitch or a recordable disc having a wide track pitch by using an amplitude of the track error signal.

30. The apparatus as claimed in claim 24, wherein the controller determines whether the type of disc is a recordable disc having a narrow track pitch or a recordable disc having a wide track pitch by using a ratio of an amplitude of the sum signal of the light receiving device and an amplitude of the track error signal.

31. The apparatus as claimed in claim 24, wherein the controller determines whether the type of the disc is a recordable disc having a narrow track pitch or a recordable disc having a wide track pitch by using a ratio of an amplitude of the track error signal and an amplitude of the focus error signal.

32. The apparatus as claimed in claim 24, wherein the controller determines whether the type of the disc is a recordable disc having a narrow track pitch or a recordable disc having a wide track pitch by combining two or more among the amplitude of the track error signal, a ratio in the amplitude between the sum signal of the light receiving device and the track error signal, and a ratio in the amplitude between the track error signal and the focus error signal.

33. The apparatus as claimed in claim 24, wherein the controller determines the type of the disc while the disc is rotated by the driving portion.

34. The apparatus as claimed in claim 24, wherein a frequency that vibrates the objective lens in the radial direction is higher than a frequency that moves the objective lens in the up or down direction.

35. The apparatus as claimed in claim 24, wherein the controller controls the driving portion to vibrate the optical pickup in the radial direction of the disc, the controller does not move the objective lens in the radial direction of the disc.

36. A method of determining a type of a disc according to different track pitches for a disc recording/reproducing system, the method comprising:

detecting a plurality of disc-type determination signals needed for disc determination while moving an objective lens in a direction perpendicular to a surface of the disc and simultaneously vibrating the objective lens in a radial direction of the disc; and monitoring each of the detected disc-type determination signals to determine whether the disc is a disc having a narrow track pitch or a disc having a wide track pitch, wherein the moving direction of the objective lens is reversed after a predetermined time after a point when one of the disc-type determination signals is determined such that a disc determination time is reduced.

37. A method of determining a type of a disc from a plurality of types of discs corresponding to different track pitches, the method comprising:

moving an objective lens of a disc recording/reproducing system in a direction perpendicular to a surface of the disc from a position previously set for focus, while simultaneously vibrating the objective lens in a radial direction of the disc;

reversing the moving direction of the objective lens after a predetermined time passes when any one of a plurality of disc-type determination signals is detected while simultaneously vibrating the objective lens in a radial direction of the disc; and repeating a predetermined number of times the reversing the moving direction of the objective lens after the predetermined time passes when any one of the plurality of disc-type determination signals is detected.

38. An apparatus for determining a type of a disc that is loaded in a disc system from a plurality of types of discs corresponding to different track pitches, the apparatus comprising:

a pickup having an objective lens;

a driving unit moving the objective lens toward and away from a surface of the disc and simultaneously vibrating the objective lens in a radial direction of the disc;

a detection unit detecting a plurality of signals needed for determining the type of the disc, while the objective lens is moved by the driving unit; and a controller determining the type of the disc loaded in the disc system by using the detected signals for determining the type of the disc.

* * * * *

UNITED STATES PATENT AND TRADEMARK OFFICE
CERTIFICATE OF CORRECTION

PATENT NO. : 7,324,418 B2 Page 1 of 1
APPLICATION NO. : 10/885896
DATED : January 29, 2008
INVENTOR(S) : Byoung-ho Choi et al.

It is certified that error appears in the above-identified patent and that said Letters Patent is hereby corrected as shown below:

Column 12, line 20, change "id" to --in--.

Column 12, lines 38-39, delete "down or up".

Column 13, line 10, insert --,-- before "while".

Signed and Sealed this

Twentieth Day of May, 2008

JON W. DUDAS
*Director of the United States Patent and Trademark Office*